United States Patent
Bostick et al.

(10) Patent No.: US 9,563,421 B2
(45) Date of Patent: Feb. 7, 2017

(54) REFINING DATA UNDERSTANDING THROUGH IMPACT ANALYSIS

(71) Applicant: International Business Machines Corporation, Armonk, NY (US)

(72) Inventors: James E. Bostick, Cedar Park, TX (US); John M. Ganci, Jr., Cary, NC (US); Arvind Singh, Waukegan, IL (US); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 14/451,500

(22) Filed: Aug. 5, 2014

(65) Prior Publication Data

US 2016/0041824 A1    Feb. 11, 2016

(51) Int. Cl.
*G06F 9/44*        (2006.01)

(52) U.S. Cl.
CPC .. *G06F 8/75* (2013.01); *G06F 8/72* (2013.01)

(58) Field of Classification Search
None
See application file for complete search history.

(56) References Cited

U.S. PATENT DOCUMENTS

| | | | |
|---|---|---|---|
| 6,405,364 B1* | 6/2002 | Bowman-Amuah | G06Q 10/06 717/101 |
| 6,748,584 B1* | 6/2004 | Witchel | G06F 8/71 714/37 |
| 8,595,711 B2* | 11/2013 | Clifton | G06F 8/443 717/145 |
| 2005/0155026 A1* | 7/2005 | DeWitt, Jr. | G06F 8/443 717/158 |
| 2006/0158354 A1* | 7/2006 | Aberg | G06F 8/447 341/50 |
| 2006/0218535 A1* | 9/2006 | Delmonte | G06F 11/3457 717/127 |
| 2007/0050343 A1* | 3/2007 | Siddaramappa | G06F 17/30908 707/999.003 |

(Continued)

FOREIGN PATENT DOCUMENTS

| | | |
|---|---|---|
| EP | 1388054 B1 | 4/2010 |
| WO | 02093367 A1 | 11/2002 |

OTHER PUBLICATIONS

Anonymous, "Dynamic Determinacy Analysis", An IP.com Prior Art Database Technical Disclosure, IP.com No. IPCOM000224582D, Electronic Publication: Jan. 2, 2013, website: <http://ip.com/IPCOM/000224582>.

(Continued)

*Primary Examiner* — Wei Zhen
*Assistant Examiner* — Binh Luu
(74) *Attorney, Agent, or Firm* — Christopher McLane; Edward J. Wixted

(57) ABSTRACT

In an approach for refining data for an impact analysis, a computer receives a selection of source code and impact analysis criteria, wherein the impact analysis criteria includes at least a time frame. The computer determines a subset of the selected source code, the subset within a time frame specified by the selected impact analysis criteria. The computer returns results based on the selected impact analysis criteria, wherein the results include the subset of the selected source code.

20 Claims, 3 Drawing Sheets

(56) References Cited

U.S. PATENT DOCUMENTS

| | | | |
|---|---|---|---|
| 2007/0214099 A1 | 9/2007 | Marfatia et al. | |
| 2008/0059942 A1* | 3/2008 | Brown | G06F 8/24 717/101 |
| 2008/0196012 A1* | 8/2008 | Cohen | G06F 8/75 717/125 |
| 2010/0275182 A1 | 10/2010 | Marfatia et al. | |
| 2013/0007701 A1* | 1/2013 | Sundararam | G06F 8/30 717/109 |
| 2013/0042221 A1 | 2/2013 | Mehalingam | |
| 2013/0231967 A1 | 9/2013 | Jesionowski et al. | |
| 2013/0275458 A1* | 10/2013 | Bhatt | G06F 17/30657 707/769 |
| 2014/0096113 A1* | 4/2014 | Kuehlmann | G06F 11/3672 717/126 |
| 2014/0115438 A1* | 4/2014 | Bhatt | G06F 17/248 715/230 |

OTHER PUBLICATIONS

Antoniol et al., "Variable Precision Reaching Definitions Analysis for Software Maintenance", 0-8186-7892-5/97, copyright 1997 IEEE, pp. 60-67.

* cited by examiner

REFINING DATA UNDERSTANDING THROUGH IMPACT ANALYSIS

BACKGROUND OF THE INVENTION

The present invention relates generally to the field of software analysis, and more particularly to refining data understanding through impact analysis.

Software is developed for a variety of purposes, typically to meet client requirements, a perceived need, or for personal use. Software development employs a software development methodology, either a software development life cycle (i.e., plan describing how to develop, maintain, and replace software) or agile methodology (i.e., iterative and incremental collaborative process of cross-functional teams). Examples of software development life cycle methodologies include: waterfall (i.e., sequential development), spiral (i.e., combination of design and prototyping), and incremental (i.e., breaking a project into smaller segments). Types of agile methodologies include: rapid application development (i.e., minimal planning with rapid prototyping), adaptive software development (i.e., repeating series of speculate, collaborate, and learn cycles), and dynamic system development method (i.e., iterative and incremental with continuous user/customer involvement).

Software development involves designing, programming, testing, and maintaining of source code from inception to completion of a software program. Programming involves the creation of a software program through written source code. Source code is a collection of computer instructions written in a computer language which specifies actions to be performed by a computer device to achieve the requirements. Once a software program is developed, computer programmers can employ a combination of different types of software testing (e.g., static or dynamic testing) to verify requirements are met and to eliminate unforeseen errors. Static testing verifies the code structure, syntax, and data flow. Dynamic testing executes the software program code with a given set of test cases verifying functionality. At the successful completion of software testing, a software program is then released to use in the manner it was developed and may be enhanced or maintained over time.

After development and release, software programs may evolve through technology changes, maintenance, enhancements, and innovation. To evaluate ramifications of a planned or incorporated change, an impact analysis may be employed on the software. Impact analysis includes a collection of techniques for determining the effects of a proposed or implemented change on other parts of software. Impact analysis supports the comprehension, implementation, and evaluation of changes within a software program by identifying what is affected, where source code changes need to be made, and why a change should be made by analyzing program syntax and focusing on the source code.

SUMMARY

Aspects of the present invention disclose a method, computer program product, and system for refining data for an impact analysis. According to one embodiment of the present invention, a computer receives a selection of source code and impact analysis criteria, wherein the impact analysis criteria includes at least a time frame. The computer determines a subset of the selected source code, the subset within a time frame specified by the selected impact analysis criteria. The computer returns results based on the selected impact analysis criteria, wherein the results include the subset of the selected source code.

DETAILED DESCRIPTION

Software maintenance can be a labor intensive aspect of software development. Impact analysis assists to mitigate the ripple effect of changes and identify incurred errors as a software program evolves in response to technology (e.g., advancement and obsolescence), maintenance (i.e., fixing software defects or errors), enhancement (i.e., addition of a new feature or change leading to product improvements), and developer innovation (e.g., implementation of subtle changes to improve a product without a change request). Embodiments of the present invention recognize that current impact analysis results, while identifying the aforementioned items, can be confusing due to the large amount of information and repetition of some data displayed to a user.

As recognized by embodiments of the invention, impact analysis results may be improved through modifications to the software program source code being analyzed and by providing additional analysis criteria to limit results. Impact analysis results are sometimes hindered by the inclusion of, for example, dead, legacy, and/or batch code. Dead code is code within the source code of a program which may never be executed or is executed but the results are never used in any other computation. Legacy code is source code that relates to a no longer supported or manufactured operating system or technology. In some embodiments, legacy code is source code within a program which has become inactive or is no longer executable due to updates and/or changes and is effectively dead code. Batch code is not part of the base program source code and may only be executed periodically under defined conditions. Batch code is a type of script or text file (i.e., un-compiled code) that interprets and automates the execution of tasks in computing environments. By removing dead, legacy, and/or batch code from the impact analysis, the amount of information to be evaluated may be reduced providing more beneficial results to a user. Expansion of analysis criteria for an impact analysis may also provide more useful results to a user by narrowing the scope of the impact analysis. Additional analysis criteria for an impact analysis may encompass, for example, entering a time frame (e.g., identify a change of access date of a file to search on), business domain mapping (e.g., analyze portions of source code associated with a specified domain), and a frequently used ranking provision (e.g., ordering of results from high to low).

Figure 1:
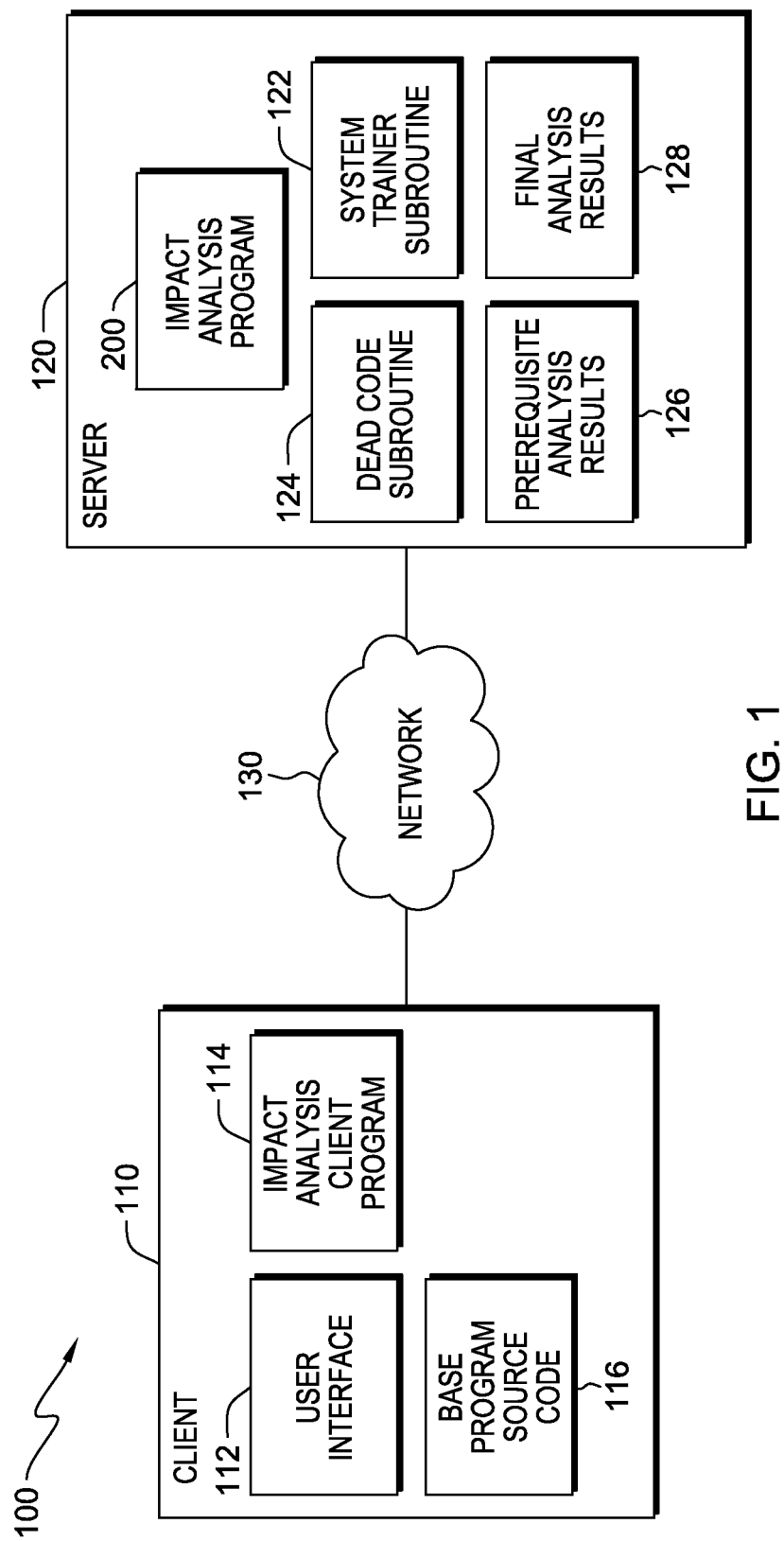
FIG. 1 illustrates a functional block diagram illustrating a computing environment, according to an embodiment of the present invention.

The present invention will now be described in detail with reference to the Figures. FIG. 1 is a functional block diagram illustrating a computing system 100, in accordance with one embodiment of the present invention. FIG. 1 provides only an illustration of one embodiment and does not imply any limitations with regard to the environments in which different embodiments may be implemented.

In the depicted embodiment, computing system 100 includes client 110 and server 120 interconnected over network 130. Computing system 100 may include additional clients, computing devices, servers, computers, storage devices, or other devices not shown. Network 130 may be a local area network (LAN), a wide area network (WAN), such as the Internet, any combination thereof, or any combination of connections and protocols that will support communications between client 110 and server 120, in accordance with embodiments of the invention. Network 130 may include wired, wireless, or fiber optic connections.

Client 110 may be a web server or any other electronic device or computing system capable of processing program instructions and receiving and sending data. In some embodiments, client 110 may be a laptop computer, a tablet computer, a netbook computer, a personal computer (PC), a desktop computer, a personal digital assistant (PDA), a smart phone, or any programmable electronic device capable of communicating with server 120 via network 130. In other embodiments, client 110 may represent a server computing system utilizing multiple computers as a server system, such as in a cloud computing environment. In still other embodiments, client 110 represents a computing system utilizing clustered computers and components to act as a single pool of seamless resources. In general, client 110 is representative of any electronic device or combination of electronic devices capable of executing machine-readable program instructions, as described in greater detail with regard to FIG. 3, in accordance with embodiments of the present invention. Client 110 contains user interface 112, impact analysis client program 114, and base program source code 116. Client 110 may include components as depicted and described in further detail with respect to FIG. 3.

User interface 112 operates on client 110 to generate display signals corresponding to content, such as windows, menus, and icons and to receive various forms of user input. User interface 112 may comprise one or more interfaces, such as an operating system interface and/or an application interface. In one embodiment, user interface 112 comprises an interface to impact analysis client program 114. In some other embodiments, user interface 112 provides an interface to base program source code 116 for access and modification. User interface 112 may send inputs to impact analysis client program 114 for utilization by impact analysis program 200. User interface 112 may display data received by impact analysis client program 114, prerequisite analysis results 126, and final analysis results 128.

Impact analysis client program 114 operates to access impact analysis program 200. Impact analysis client program 114 provides user interface 112 with impact analysis criteria available for selection and user input prior to execution of impact analysis program 200. In one embodiment, impact analysis client program 114 is a stand-alone program. In another embodiment, impact analysis client program 114 is a function integrated within another program (e.g., add-on to another impact analysis program). In one embodiment, impact analysis client program 114 resides on client 110. In other embodiments, impact analysis client program 114 may reside on other devices, such as server 120, provided that impact analysis client program 114 is accessible to user interface 112, and provided that impact analysis client program 114 has access to impact analysis program 200.

Base program source code 116 is a generic file comprising the source code for a software program, software application, or multiple software programs or applications. Base program source code 116 may be any program or application that contains source code in a computer programming language. In one embodiment, base program source code 116 is stored on client 110. In another embodiment, base program source code 116 may be stored on server 120. In some other embodiment, base program source code 116 may be stored in a database or on another storage device, not shown, accessible over network 130.

Server 120 may be a management server, a web server, or any other electronic device or computing system capable of processing program instructions and receiving and sending data. In some embodiments, server 120 may be a laptop computer, a tablet computer, a netbook computer, a PC, a desktop computer, a PDA, a smart phone, or any programmable device capable of communication with client 110 over network 130. In other embodiments, server 120 may represent a server computing system utilizing multiple computers as a server system, such as in a cloud computing environment. Server 120 contains impact analysis program 200, dead code subroutine 124, system trainer subroutine 122, prerequisite analysis results 126, and final analysis results 128. Server 120 may include components, as depicted and described in further detail, with respect to FIG. 3.

Impact analysis program 200 is a selectable refinement capability to augment an impact analysis. Impact analysis program 200 provides an expanded set of data reduction techniques and analysis criteria to reduce the number of results obtained through an impact analysis and to potentially provide more meaningful results. In one embodiment, impact analysis program 200 may be initiated in response to a user selection made through user interface 112 when impact analysis client program 114 is active. In another embodiment, impact analysis program 200 may be initiated by another impact analysis tool that incorporates impact analysis program 200. In one embodiment, impact analysis program 200 is stored on server 120. In another embodiment, impact analysis program 200 may be stored on client 110. In some other embodiment, impact analysis program 200 may be stored in a database or on another storage device, not shown, accessible over network 130.

Dead code subroutine 124 is a selectable data reduction technique on server 120. Dead code subroutine 124 is a type of compiler optimization referred to as dead code elimination. Dead code elimination optimizations utilize algorithms to minimize or maximize attributes of an executable computer program which does not affect the program results. Dead code subroutine 124 eliminates dead code (i.e., unused, inactive, unreachable code) from further analysis by impact analysis program 200. Dead code subroutine 124 reduces the size of the program, which may reduce the amount of time required to perform an impact analysis and provide more relevant results. Dead code subroutine 124 may be initiated in response to a user selection made though user interface 112 when impact analysis client program 114 is active.

System trainer subroutine 122 is a selectable data reduction technique on server 120. System trainer subroutine 122 teaches impact analysis program 200 how to determine the base system of a software program and its components. In one embodiment, system trainer subroutine 122 accepts an input (e.g., spreadsheet, text file, and program) with domain mapping. Domain mapping refers to the process of assigning identifiers to the source code of a program, based on a functionality (e.g., math computations, data acquisition, processing, etc.) or specified grouping (e.g., human resources, payroll, health care) determined by a user, through manual identification and/or natural language processing (i.e., derives meaning from human language within textual information). System trainer subroutine 122 translates the provided input file information and assigns domain mapping to the program. In another embodiment, system trainer subroutine 122 identifies program source code within base program source code 116 associated with key words entered by a user. System trainer subroutine 122 assigns the identified aspects to previously established domain mapping areas. System trainer subroutine 122 refines the program for impact analysis program 200 to potentially provide more relevant results. In some embodiments, system trainer subroutine 122 is selected in response to a user selection made though user interface 112 when impact analysis client program 114 is active.

Prerequisite analysis results 126 stores results at the completion of a data reduction technique for further use by impact analysis program 200. Prerequisite analysis results 126 may be a file, updated program, database, repository, or another storage device capable of storing the results of dead code subroutine 124 and/or system trainer subroutine 122. Prerequisite analysis results 126 stores the relevant portion of the original source code from base program source code 116. In one embodiment, prerequisite analysis results 126 are stored on server 120. In some other embodiment, prerequisite analysis results 126 may be stored in a database or on another storage device, not shown, and accessed over network 130.

Final analysis results 128 stores the outcome at the completion of impact analysis program 200 based on selected criteria and data reduction techniques. In one embodiment, final analysis results 128 are stored on server 120. In another embodiment, final analysis results 128 may be stored in a database or on another storage device, not shown, and accessed over network 130. In some other embodiment, final analysis results 128 are sent over network 130 for display on client 110 through impact analysis client program 114.

Figure 2:
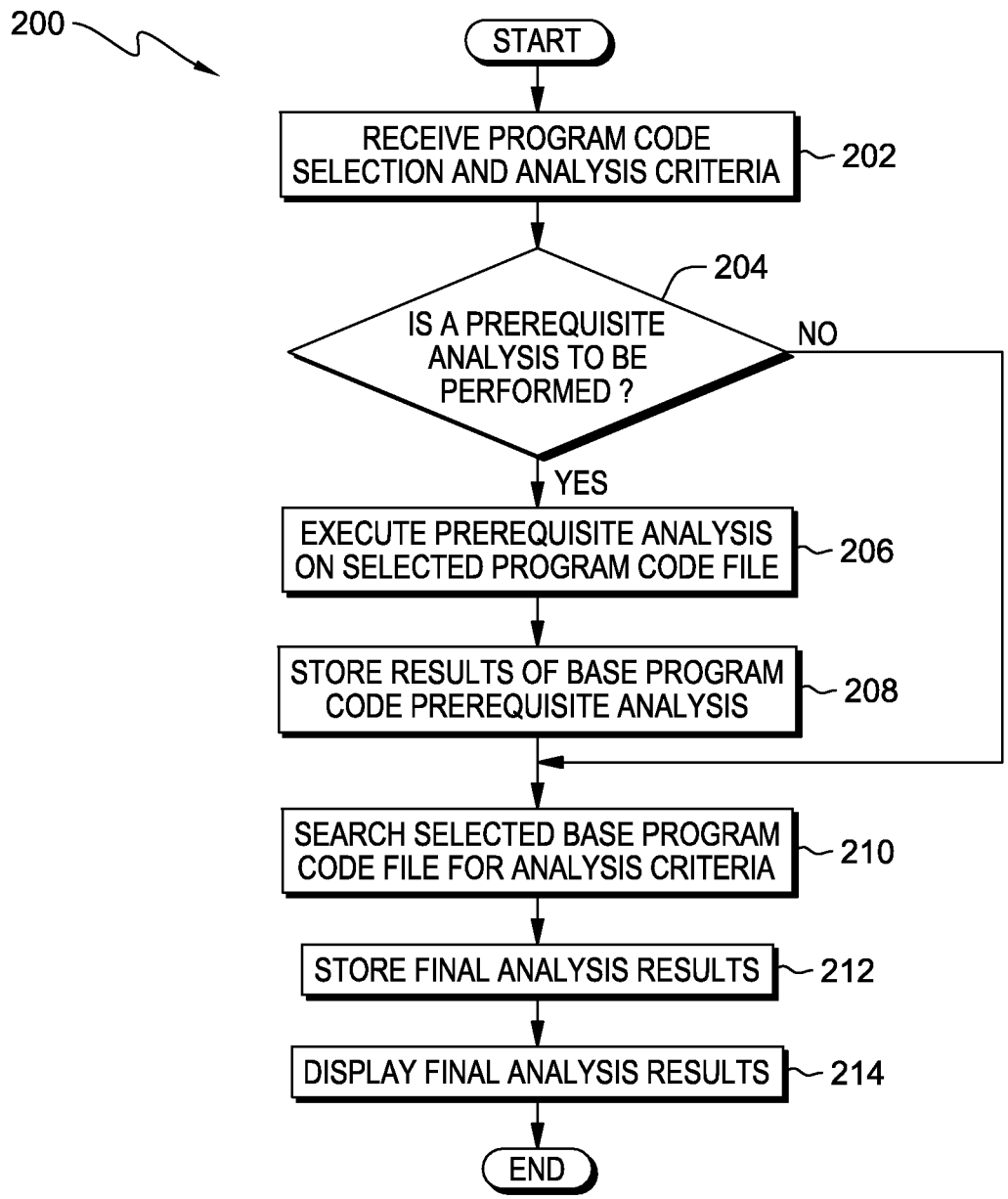
FIG. 2 illustrates a flowchart depicting operational steps of an impact analysis program on a server within the computing environment of FIG. 1 for determining the software program to be evaluated, data reduction techniques, analysis criteria, and display format, according to an embodiment of the present invention.

FIG. 2 is a flowchart depicting operational steps of impact analysis program 200, executing within the computing system of FIG. 1, in accordance with an embodiment of the present invention. In one embodiment, impact analysis program 200 evaluates software programs after the implementation of one or more data reduction techniques (e.g., dead code subroutine 124, system trainer subroutine 122) with respect to selected analysis criteria and displays results of the impact analysis for the specified portion(s) of the original program. In another embodiment, impact analysis program 200 evaluates software programs with respect to selected analysis criteria without a data reduction technique being performed and displays results of the impact analysis for the entire program. In yet another embodiment, impact analysis program 200 incorporates data reduction techniques into the selectable criteria for evaluation, analysis, and display.

Base program source code 116 comprises software program source code for a system in a computer programming language to be analyzed by impact analysis program 200. In one embodiment, impact analysis program 200 analyzes base program source code 116 entirely. In another embodiment, impact analysis program 200 analyzes a portion of base program source code 116 after employing data reduction techniques. In some embodiments, dead code subroutine 124 may operate on base program source code 116 to remove dead source code prior to running impact analysis program 200. Dead code subroutine 124 or an external dead code analysis program utilizes algorithms to analyze base program source code 116 for source code which does not affect the program results (e.g., unused, inactive, unreachable code). In one embodiment, dead code subroutine 124 may remove identified irrelevant portions of base program source code 116. In another embodiment, dead code subroutine 124 may assign active and inactive status to the code within base program source code 116 for review and action by a user. In yet another embodiment, dead code subroutine 124 may assign active and inactive status to the code within base program source code 116 and exclude inactive code from further analysis. Dead code subroutine 124 provides impact analysis program 200 with the relevant code (i.e., active code) from base program source code 116 to analyze.

In some embodiments, prior to running impact analysis program 200, system trainer subroutine 122 may operate on base program source code 116 to categorize subsets of the source code to an organized, searchable program structure (i.e., a domain mapping). System trainer subroutine 122 applies domain mapping files, specific to base program source code 116, based on functionality (e.g., math computations, data acquisition, processing, etc.) or specified grouping (e.g., human resources, payroll, health care) (i.e., annotates base program source code 116 with domain mapping file information). In one embodiment, system trainer subroutine 122 applies domain mapping files to base program source code 116 through user input and manual identification. In other embodiments, system trainer subroutine 122, or an external program, uses natural language processing and at least one set of dictionaries and rules to perform text analytics (i.e., derives meaning from human language within textual information) on base program source code 116 to determine association of code with defined domains. System trainer subroutine 122 determines the meaning of an object within base program source code 116 based on the derived meaning of an identifier. An object may be a variable, function or data structure within base program source code 116 referenced by an identifier (i.e., object description, name, label). The purpose of the object may be determined by deriving the meaning of the identifier. For example an object is assigned an identifier of "Airline Flight Status Function". By deriving the meaning from the identifier, the object is a function which contains program source code to determine airline flight status information. In one embodiment, system trainer subroutine 122 applies the determined meaning to assist in creating a cross reference table (e.g., final results based on types of use). In another embodiment, system trainer subroutine 122 applies the determined meaning on future changes to base program source code 116 to determine domain mapping. For example, based on the object description of "Foreign Language to English Translator" a user initiates a change to base program source code 116 to add "Spanish". System trainer subroutine 122 understands "Spanish" is a language and associates the added code to the domain mapping with "Foreign Language to English Translator". Text analytics can be performed using an Unstructured Information Management Architecture (UIMA) application configured to analyze unstructured information to discover knowledge that is relevant to base program source code 116. In yet another embodiment, impact analysis program 200 analyzes a further reduced portion of base program source code 116 after employing both dead code subroutine 124 and system trainer subroutine 122.

In step 202, impact analysis program 200 receives program code selection and analysis criteria. In one embodiment, impact analysis program 200 initiates in response to a user accessing impact analysis client program 114 through user interface 112. For example, impact analysis program 200 may display a graphical user interface through impact analysis client program 114 for interaction with a user. Impact analysis program 200 may request user input for a software program file to be evaluated, analysis criteria (e.g., data reduction, time frame, domain mapping, user information, etc.), and display results format (e.g., table, color coded information, order of precedence).

Through impact analysis client program 114, impact analysis program 200 receives a file name and location for base program source code 116. Impact analysis program 200 receives selections from within the available analysis criteria. In one embodiment, impact analysis program 200 receives one selection from the possible search criteria of time frames (e.g., general time frame, program access time), domain mapping (e.g., industries, human resources, procurement), and user information. In another embodiment, impact analysis program 200 receives multiple selections and combinations of the analysis criteria provided by time frames, domain mapping, language processing (e.g., changed files, previous two weeks to today, finance domain, "fixed"), and user information. In some other embodiments, impact analysis program 200 provides a reduced selection of analysis criteria based on the information within base program source code 116 (e.g., if domain mapping or user information is not incorporated in the files, an option to select a specific domain name to analyze or to search by user information may not be available).

In some embodiments, impact analysis program 200 receives user selections for the display format of the results. In one embodiment, impact analysis program 200 receives a selection to display results in a cross-reference table. In another embodiment, impact analysis program 200 receives a selection to display results in an ordered ranking (e.g., most used to least, most recent to oldest). In some other embodiment, impact analysis program 200 receives a selection to display results by user information with respect to creating and changing a software program. In other embodiments, impact analysis program 200 includes a set of default settings for the display format of the results.

In decision 204, impact analysis program 200 determines if a prerequisite analysis (i.e., data reduction technique) is to be performed. In some embodiments, data reduction techniques (e.g., dead code subroutine 124, system trainer subroutine 122) may be performed prior to impact analysis program 200 execution, and impact analysis program 200 may determine that neither data reduction technique is selected and therefore, no prerequisite analysis is to be performed (decision 204, no branch). In some embodiments, data reduction techniques are selectable from within impact analysis program 200 and received by impact analysis program 200 (see step 202). For example, impact analysis program 200 may determine that dead code subroutine 124, system trainer subroutine 122, another data reduction technique (not shown), or a combination of data reduction techniques are selected.

If impact analysis program 200 determines a prerequisite analysis is to be performed (decision 204, yes branch), impact analysis program 200 executes a prerequisite analysis on the selected program code file (step 206). If impact analysis program 200 determines a prerequisite analysis is not to be performed (decision 204, no branch), impact analysis program 200 searches the selected base program code file for analysis criteria (step 210).

In step 206, impact analysis program 200 executes the prerequisite analysis on selected base program code. For example, if the received analysis criteria (see step 202) includes a dead code analysis, impact analysis program 200 initiates execution of dead code subroutine 124 on base program source code 116. Dead code subroutine 124 identifies dead code (i.e., unused, inactive, unreachable code) within base program source code 116. In one embodiment, dead code subroutine 124 removes dead code from base program source code 116. In another embodiment, dead code subroutine 124 provides information to ignore irrelevant code within base program source code 116 from further analysis. In another example, if the received analysis criteria (see step 202) includes a system trainer analysis, impact analysis program 200 executes system trainer subroutine 122 on base program source code 116. In one embodiment, system trainer subroutine 122 associates a file containing domain mapping to base program source code 116. In another embodiment, system trainer subroutine 122 filters and identifies information within base program source code 116 based on user specified criteria (e.g., keywords, a selected defined domain in the program code, etc.). In some other embodiment, impact analysis program 200 executes both dead code subroutine 124 and system trainer subroutine 122. In such embodiment, impact analysis program 200 initiates system trainer subroutine 122 and identifies portions of base program source code 116 for use by dead code subroutine 124. Impact analysis program 200 may initiate dead code subroutine 124 which identifies unused code within the results of system trainer subroutine 122. Dead code subroutine 124 may not identify unused code within the remaining unidentified portions of base program source code 116.

In step 208, impact analysis program 200 stores the results of base program code prerequisite analysis. Impact analysis program 200 stores the results of the data reduction techniques performed on base program source code 116 in prerequisite analysis results 126. In some embodiments, impact analysis program 200 stores dead code subroutine 124 results, system trainer subroutine 122 results, or the combined results of system trainer subroutine 122 and dead code subroutine 124 in prerequisite analysis results 126 (i.e., active code for a specified domain).

In step 210, impact analysis program 200 analyzes the selected program code file for analysis criteria. In one embodiment, impact analysis program 200 analyzes base program source code 116 for analysis criteria. In another embodiment, impact analysis program 200 analyzes prerequisite analysis results 126 for analysis criteria. Impact analysis program 200 analyzes the selected program code file for analysis criteria (e.g., time frame, business domain, user). In some embodiments, impact analysis program 200 performs an analysis with a combination of analysis criteria selections (e.g., multiple time criteria, multiple domain mapping criteria, combination of time, business domains, and user criteria, etc.).

In one embodiment, impact analysis program 200 performs an analysis specific to time frame analysis criteria (e.g., date created, date modified, date last utilized, access date, time period, etc.). From step 202, impact analysis program 200, receives time frame analysis criteria. Impact analysis program 200 identifies a subset of programs and code from within base program code 116 based on the associated time stamps assigned to the programs and code which meet the specified time frame analysis criteria. In some embodiments, impact analysis program 200 searches within the subset of programs and code for further analysis criteria. In an example embodiment, an error has arisen within a system, and a user hypothesizes that the error was introduced into the system sometime within a two-week time period in which the system receives a number of software updates. Through impact analysis client program 114, the user identifies the search criteria as a time frame of the corresponding two-week time period. In such an example, impact analysis program 200 analyzes only the aspects of base program source code 116 with, for example, a date modified or date created time stamp within the specified two-week time period. In another embodiment, impact analysis program 200 analyzes base program source code 116 for time frame analysis criteria relative to when a software program file was last utilized. In some other embodiment, impact analysis program 200 analyzes base program source code 116 for time frame analysis criteria with respect to when a software program was accessed by another software program.

In another embodiment, impact analysis program 200 performs an analysis for specified domain mapping analysis criteria. For example, impact analysis program 200 analyzes impacts to base program source code 116 within a specified business domain. In an example embodiment, base program source code 116 is mapped for business domains (e.g., finance, business development, purchasing, etc.), and changes to billing are to be implemented. Impact analysis program 200 receives analysis criteria to identify aspects within finance related to billing. Impact analysis program 200 does not analyze unidentified business domains. In another embodiment, impact analysis program 200 utilizes text analytics and natural language processing methods, as previously described, to understand descriptions within base program source code 116 to determine probable association with a business domain. In some other embodiment, impact analysis program 200 utilizes a cross-reference table noting the types of utilization for the business domains for searches.

In some other embodiment, impact analysis program 200 performs an analysis for user information (e.g., created by user, edited by user, etc.). Impact analysis program 200 accesses the metadata associated with base program source code 116 to determine user information. Metadata describes the content and context of data files, facilitating the discovery of relevant information. In one embodiment, impact analysis program 200 analyzes base program source code 116 for aspects created by a specified user. In another embodiment, impact analysis program 200 analyzes base program source code 116 for updates by a user.

In step 212, impact analysis program 200, stores final analysis results 128. Impact analysis program 200 stores the relevant results (e.g., source code, domain mapping, time frame, user information, etc.) identified in base program source code 116 matching the analysis criteria in final analysis results 128. Impact analysis program 200 does not store information from base program source code 116 that does not meet the analysis criteria. In the example embodiment, impact analysis program 200 returns identified portions of code within base program source code 116 which fall into the range set by the analysis criteria time frame of the two-week period (i.e., returned results have an associated time stamp occurring at any point on or within the identified start and stop dates). In one embodiment, final analysis results 128 stores the results from the selection of one or more analysis criteria options (e.g., changes made within a domain for a set time frame). In another embodiment, impact analysis program 200 stores relevant metadata with analysis criteria results for further utilization (e.g., user information). In some other embodiment, impact analysis program 200 stores final analysis results 128 with the history information associated with the analysis results (e.g., frequency of use, most changed, usage, user access, etc.).

In step 214, impact analysis program 200 displays final analysis results 128. Impact analysis program 200 displays final analysis results 128 with respect to the analysis criteria selected. Impact analysis program 200 displays final analysis results 128 based upon user selected display criteria in a manner consistent with achieving the desired purpose of the selected analysis criteria. In the example embodiment, a user may select to display the two-week period time frame results in a spreadsheet, dividing the data into categories such as associated program name, changed lines of source code, and time stamp, to compare with a prior file to locate the introduced error. In one embodiment, impact analysis program 200 displays final analysis results 128 as a cross-reference table (e.g., domain mapping to code, redundant code, unused objects, creation dates, difference analysis, etc.). In another embodiment, impact analysis program 200 displays final analysis results 128 as an exportable file (e.g., text, spreadsheet, diagram, databases, etc.) for utilization by another program (e.g., perform cost sizing, presentation charts, data utilization, complexity metrics, etc.). In some embodiments, impact analysis program 200 displays final analysis results 128 graphically (e.g., flow charts, variable tracing diagrams, organizational diagrams, trends, etc.). In yet another embodiment, impact analysis program 200 displays final analysis results 128 in a specified order (e.g., alphabetical by domain or program, ascending order, descending order, ranking, etc.). In still other embodiments, impact analysis program 200 displays user information (e.g., name, e-mail address, etc.) from the metadata. Impact analysis program 200 provides the option to contact a specified user (e.g., developer of a program, implementer of a change, designated expert, etc.) from the user information through electronic communications (e.g., e-mail, instant messaging). In still some other embodiments, impact analysis program 200 provides a report with respect to program utilization (e.g., frequency of use, most changed).

Figure 3:
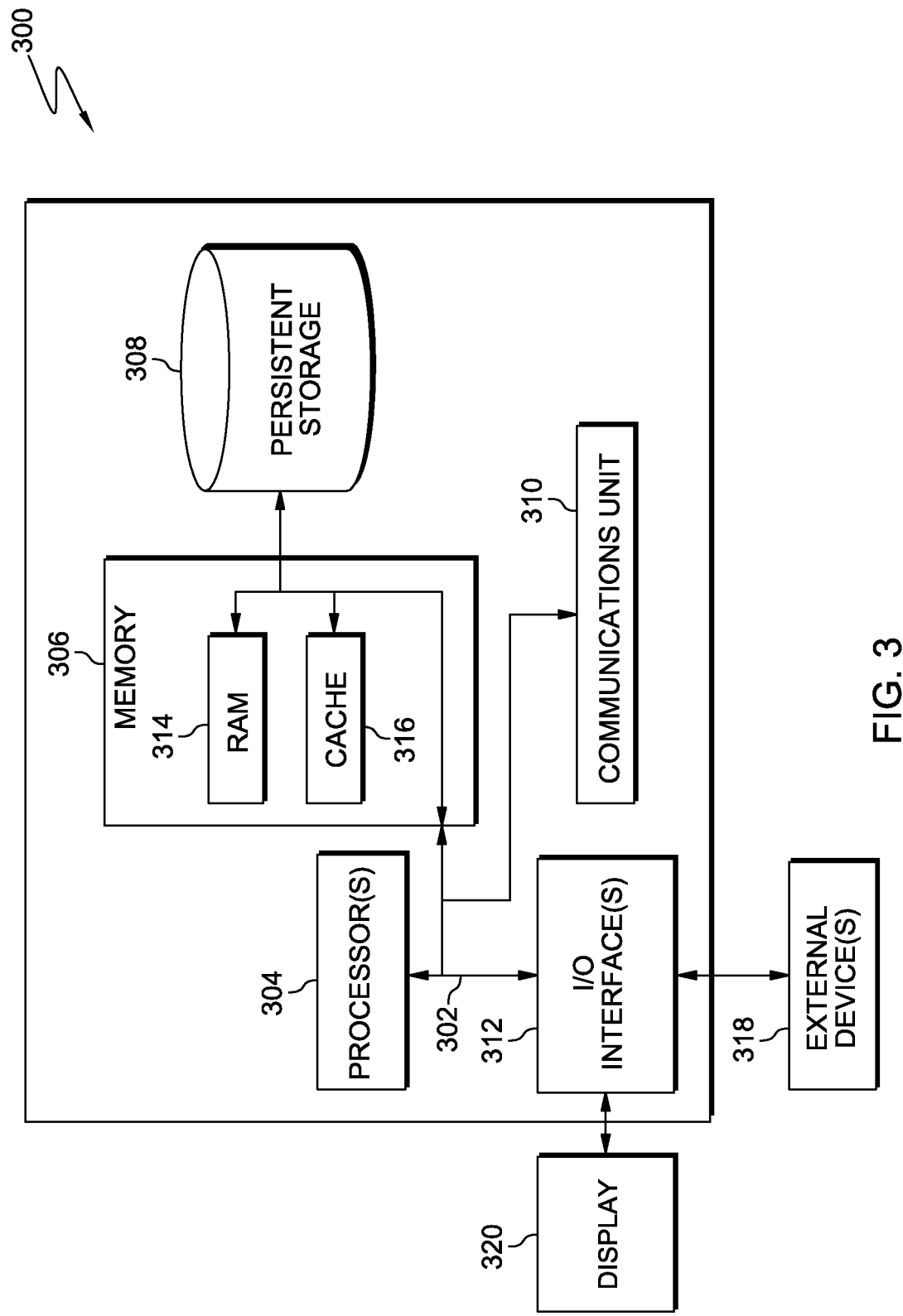
FIG. 3 illustrates a block diagram of components of the client and the server executing the impact analysis program, according to an embodiment of the present invention.

FIG. 3 depicts a block diagram of components of computing system 300, which is representative of computing system 100, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing system 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media.

Impact analysis program 200, dead code subroutine 124, system trainer subroutine 122, prerequisite analysis results 126, final analysis results 128, base program source code 116, and impact analysis client program 114 are stored in persistent storage 308 for execution/and or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of enterprise grid and client devices. In these examples, communications unit 310 includes one or more network interface cards. Communications unit 310 may provide communications through the use of either or both physical and wireless communications links. Impact analysis program 200, dead code subroutine 124, system trainer subroutine 122, prerequisite analysis results 126, final analysis results 128, base program source code 116, and impact analysis client program 114 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., impact analysis program 200, dead code subroutine 124, system trainer subroutine 122, prerequisite analysis results 126, final analysis results 128, base program source code 116, and impact analysis client program 114, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for refining data for an impact analysis, the method comprising:

a computer receiving a selection of legacy source code and impact analysis criteria, wherein the impact analysis criteria includes at least a time frame, wherein the legacy source code is source code that relates to an operating system that is no longer supported;

the computer identifying dead code within the selected legacy source code;

the computer excluding the identified dead code from the selected legacy source code;

the computer identifying inactive code within the selected legacy source code, wherein the inactive code is source code that may no longer be executable due to updates and changes;

the computer excluding the identified inactive code within the selected legacy code;

the computer determining a subset of the selected legacy source code, the subset within a time frame specified by the selected impact analysis criteria; and the computer returning results based on the selected impact analysis criteria, wherein the results are provided in a cross reference table for the at least time frame that includes the subset of the selected legacy source code and at least an e-mail address that identifies at least a user associated with the subset of the selected source code.

2. The method of claim 1, wherein the impact analysis criteria further includes a grouping, and the method further comprises:

the computer annotating the subset of the selected legacy source code based on an association with a grouping specified by the selected impact analysis criteria, wherein the grouping is based on domain mapping that assigns identifiers based on functionality associated with the received selection of source code.

3. The method of claim 2, wherein the step of the computer annotating the subset of the selected legacy source code further comprises:

the computer receiving an input file that includes a domain mapping for the subset of the selected legacy source code; and the computer assigning the domain mapping to the subset of the selected legacy source code based on a translation of the received input file.

4. The method of claim 1, wherein the results further include an identification of one or more users associated with editing the subset of the selected legacy source code.

5. The method of claim 1, wherein the computer returning results comprises:

the computer displaying the subset of the selected legacy source code in a defined order, wherein the defined order is based on usage within the time frame specified by the selected impact analysis criteria.

6. The method of claim 1, further comprising:

the computer identifying selected legacy source code that is updated within the time frame specified by the selected impact analysis criteria.

7. The method of claim 1, wherein the computer performing the action to the identified inactive code within the selected legacy code further comprises:

the computer providing the identified inactive code within the selected legacy code to a user; and the computer receiving an action from the user with respect to the identified inactive code within the selected legacy code, wherein the action excludes the inactive code from a further analysis.

8. The method of claim 1 further comprising, providing, by one or more computer processors, an option to contact the identified at least user associated with the subset of the selected source code via electronic communications based on the provided at least e-mail address.

9. A computer program product for refining data for an impact analysis, the computer program product comprising:
one or more computer readable storage media and program instructions stored on the one or more computer readable storage media, the program instructions comprising:
program instructions to receive a selection of legacy source code and impact analysis criteria, wherein the impact analysis criteria includes at least a time frame, wherein the legacy source code is source code that relates to an operating system that is no longer supported;
program instructions to identify dead code within the selected legacy source code;
program instructions to exclude the identified dead code from the selected legacy source code;
program instructions to identify inactive code within the selected legacy source code, wherein the inactive code is source code that may no longer be executable due to updates and changes;
program instructions to exclude the identified inactive code within the selected legacy code;
program instructions to determine a subset of the selected legacy source code, the subset within a time frame specified by the selected impact analysis criteria; and
program instruction to return results based on the selected impact analysis criteria, wherein the results are provided in a cross reference table for the at least time frame that includes the subset of the selected legacy source code and at least an e-mail address that identifies at least a user associated with the subset of the selected source code.

10. The computer program product of claim 9, wherein the impact analysis criteria further includes a grouping, and the computer program product further comprises:
program instructions, stored on the one or more computer readable storage media, to annotate the subset of the selected legacy source code based on an association with a grouping specified by the selected impact analysis criteria.

11. The computer program product of claim 10, wherein program instructions to annotate the subset of the selected legacy source code further comprises:
program instructions, stored on the one or more computer readable storage media, to receive an input file that includes a domain mapping for the subset of the selected legacy source code; and
program instructions, stored on the one or more computer readable storage media, to assign the domain mapping to the subset of the selected legacy source code based on a translation of the received input file.

12. The computer program product of claim 9, wherein program instructions to return results comprise:
program instructions to display the subset of the selected legacy source code in a defined order, wherein the defined order is based on usage within the time frame specified by the selected impact analysis criteria.

13. The computer program product of claim 9, further comprising:
program instructions, stored on the one or more computer readable storage media, to identify selected legacy source code that is updated within the time frame specified by the selected impact analysis criteria.

14. The computer program product of claim 9, wherein to perform the action to the identified inactive code within the selected legacy code further comprises:
program instructions, stored on the one or more computer readable storage media, to provide the identified inactive code within the selected legacy code to a user;
program instructions, stored on the one or more computer readable storage media, to receive an action from the user with respect to the identified inactive code within the selected legacy code, wherein the action excludes the inactive code from a further analysis.

15. A computer system for refining data for an impact analysis, the computer system comprising:
one or more computer processors, one or more computer readable storage media, and program instructions stored on the computer readable storage media for execution by at least one of the one or more processors, the program instructions comprising:
program instructions to receive a selection of legacy source code and impact analysis criteria, wherein the impact analysis criteria includes at least a time frame, wherein the legacy source code is source code that relates to an operating system that is no longer supported;
program instructions to identify dead code within the selected legacy source code;
program instructions to exclude the identified dead code from the selected legacy source code;
program instructions to identify inactive code within the selected legacy source code, wherein the inactive code is source code that may no longer be executable due to updates and changes;
program instructions to exclude the identified inactive code within the selected legacy code;
program instructions to determine a subset of the selected legacy source code, the subset within a time frame specified by the selected impact analysis criteria; and
program instruction to return results based on the selected impact analysis criteria, wherein the results are provided in a cross reference table for the at least time frame that includes the subset of the selected legacy source code and at least an e-mail address that identifies at least a user associated with the subset of the selected source code.

16. The computer system of claim 15, wherein the impact analysis criteria further includes a grouping, and the computer system further comprises:
program instructions, stored on the computer readable storage media for execution by at least one of the one or more processors, to annotate the subset of the selected legacy source code based on an association with a grouping specified by the selected impact analysis criteria.

17. The computer system of claim 16, wherein program instructions to annotate the subset of the selected legacy source code further comprises:
program instructions, stored on the one or more computer readable storage media, to receive an input file that includes a domain mapping for the subset of the selected legacy source code; and
program instructions, stored on the one or more computer readable storage media, to assign the domain mapping to the subset of the selected legacy source code based on a translation of the received input file.

18. The computer system of claim 15, wherein program instructions to return results comprise:

program instructions to display the subset of the selected legacy source code in a defined order, wherein the defined order is based on usage within the time frame specified by the selected impact analysis criteria.

19. The computer system of claim 15, wherein the impact analysis criteria includes a time frame, a grouping, and user information with respect to a user that changes the legacy source code, wherein the user information includes a name and e-mail address.

20. The computer system of claim 15 wherein to determine a subset of the selected legacy source code, the subset within a time frame specified by the selected impact analysis criteria further comprises program instructions, stored on the computer readable storage media for execution by at least one of the one or more processors to:
   identify dead code within the selected legacy source code;
   exclude the identified dead code from the selected legacy source code;
   annotate the non-excluded selected legacy source code based on an association with a grouping that assigns identifiers based on functionality associated with the received selection of source code through text analytics;
   receive a specified grouping;
   identify a subset of the annotated non-excluded selected legacy source code based on the received specified grouping;
   receive additional impact analysis criteria; and
   determine a subset of legacy source code within the identified subset of annotated non-excluded selected legacy source code based on the received additional impact analysis criteria.

* * * * *